April 8, 1952     I. MJELVA     2,592,450
LAWN EDGER
Filed Feb. 2, 1950
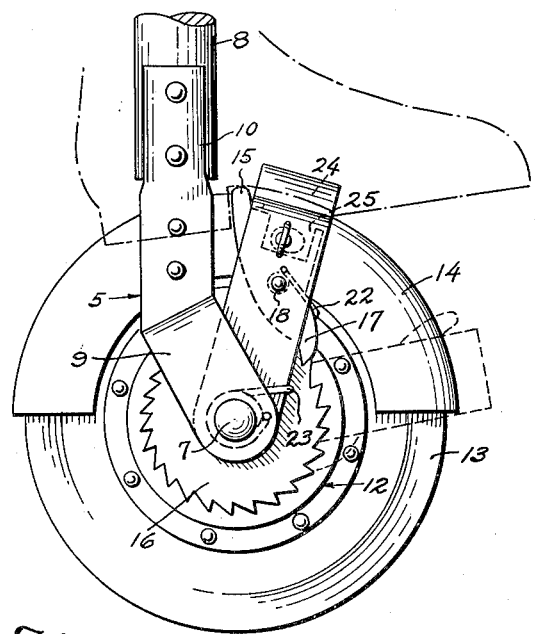
Fig. 3.
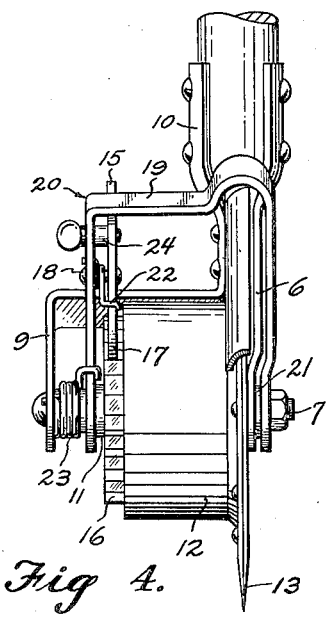
Fig. 4.
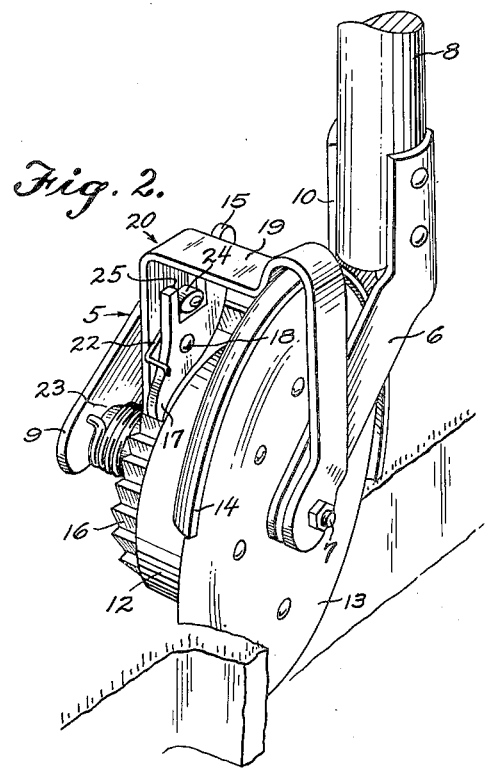
Fig. 2.
Fig. 1.
INVENTOR.
INGVALD MJELVA
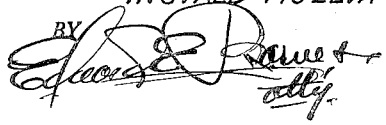

Patented Apr. 8, 1952

2,592,450

UNITED STATES PATENT OFFICE 2,592,450

LAWN EDGER

Ingvald Mjelva, Seattle, Wash.

Application February 2, 1950, Serial No. 144,011

1 Claim. (Cl. 30—292)

This invention relates to lawn edgers, and particularly edgers of the hand-operated type as distinguished from lawn edgers which are power-driven. For its general objects the invention aims to devise a hand-operated edger which requires little effort to use and which performs its intended lawn-edging office with far greater efficiency than can be obtained with prior hand-operated edgers.

It is a further and more particular object to engineer a hand-operated type of edger embodying a treadle as the agent responsible for giving travelling movement to the cutting wheel, and which enables this treadle to be activated by downwardly directed pressure of the user's foot, calling for the use of the hands only to guide the edger along its desired path.

It is a still further and particular object to devise a treadle-powered lawn edger in which the treadle may be made active or inactive at will, and in which the edger, when the said treadle is inactivated, may be pushed by hand along its course in substantially the same manner as the ordinary hand-operated edger.

As yet further objects the invention aims to provide a lawn edger which may be inexpensively produced, one the driving parts of which are not subject to wear, and one which requires little, if any, servicing care other than that which should be prudently given to any piece of equipment employing moving parts.

With the foregoing and other still more particular objects and advantages in view, the invention consists in the novel construction and in the adaptation and combination of parts hereinafter described and claimed.

In the accompanying drawings:

Figure 1 is a somewhat schematic view illustrating the edger in course of being forced by foot pressure into a piece of turf which is to be edged, and indicating the manner in which the foot is thereupon employed to press down upon the treadle and initiate a "walking" travel of the tool.

Fig. 2 is an enlarged perspective view showing the edger in the performance of its edging function.

Fig. 3 is a side elevational view; and

Fig. 4 is a front elevational view of the edger, each of said Figs. 2, 3, and 4 being fragmentary to the extent that only a portion of the handle is portrayed.

Referring to said drawing, the numerals 5 and 6 indicate companion fork-arms of a frame, with 7 denoting a traversing axle-bolt received through apertured ends of the fork-arms, and 8 designating a handle which is made secure to the root ends of such fork-arms to project more or less as a rectilineal prolongation of the frame for the purpose of guiding the tool in the performance of its edging function. The fork-arm 5 is provided with a median bend giving to the arm a double-L shape in end elevation to produce an outer free limb 9 offset laterally a material distance beyond an inner root section 10, the purpose whereof is to give substantial width to the throat defined between the two fork-arms.

11 indicates a bushing journaled upon the axle-bolt. Concentric with and made fast to the bushing is a flanged drum 12, and riveted or otherwise secured to the flange is a cutting wheel 13. I show the cutting wheel as being disc-shaped but a dentated or "star wheel" cutter might as well be used. A half-circle guard 14, skirted upon the inner side, is riveted or otherwise secured to the frame to overlie the cutting wheel.

Reverting to the drum, the same has an axial length somewhat shorter than the total span of the throat, and there is integrated with this drum upon the end thereof opposite the flange a recessed ratchet wheel 16. Designated by 20 is a treadle-piece made to a substantial U-shape and having its free ends apertured to take a journal support from the axle-bolt, with one said end bearing against an inner exposed end of the bushing 11 and the other end bearing against a washer 21 which in turn bears against the outer face of the fork-arm 6. A lever of the first order is pivoted, as at 18, to the outer limb of the treadle-piece and the toe 17 of this lever serves as a pawl for the ratchet wheel. On the other or heel end of the lever there is provided a finger extension arranged and adapted to occupy an exposed position to the rear of the cross-arm 19 of the treadle-piece. Taking a purchase from the treadle-piece, a sear spring 22 yieldingly urges the pawl into ratcheting engagement with the ratchet teeth of the drum. A second sear-type spring 23, received upon the axle-bolt to occupy a position between the treadle-piece and the axle-sustaining leg 9 of the fork-arm 5, acts to return the treadle-piece, placing a torsional load upon the latter to yieldingly retract the same in a direction counter to its wheel-propelling movement.

The heel end of the lever is made furcate, and rotatable in the slot 25 thereby provided is a thumb operated dog 24, the purpose whereof is to enable the operator to inactivate the pawl by forcing the heel end rearwardly and responsively lifting and holding the pawl out of engagement with the ratchet wheel. When the turf to be cut is quite soft and introduces no particular resistance to an edging operation it then may be desirable to inactivate the pawl and use the edger in a conventional manner, and which is to say simply by pushing the same along its intended cutting path.

In operating the edger the user locates the handle in a substantial vertical position and, after pressing the same downwardly to cause the cutting wheel to penetrate the turf, simply steps on the treadle-piece and, in repeating sequences of successive actions, alternately presses downwardly on the treadle-piece and releases the latter, whereupon the ratching action of the pawl turns the drum and its connected cutting wheel to cause the wheel to "walk" and slit the turf. The downward pressure of the foot upon the treadle holds the cutting wheel against rising as well as giving turning motion to the wheel. Due to the operator's ability to effectuate a steady advance and utilize the hands solely to guide the tool a true cutting line is obtained and almost any edging pattern may be easily followed. This ability to accurately trace a desired edging line gives to the tool a marked advantage over the rather ragged lines obtained from push-type hand-operated edgers but perhaps even more important is the ease of operation, almost no effort being required to give the required "walking" travel to the cutting wheel. It will be seen that I have given the operator a mechanical advantage and while this does perforce slow the cutting speed, this slower speed is in fact advantageous as it enables the user to more easily guide the wheel along a desired course.

The significance of forming the lever with a finger extension 15 is that the pawl can still be operated even though the spring 22 might, through crystallization or other cause, break in usage. The operator may then duplicate the function of the spring by exerting forward pressure from the sole of his shoe against the said finger. It is pointed out that the ratchet drive invention, in addition to usage in an edger, lends itself to use with the two-wheeled hand-operated trench cutters. These and other possible modifications will largely suggest themselves. It is my intention that no limitations be implied and that the hereto annexed claims be read with the broadest interpretation to which the employed language fairly admits.

What I claim is:

A foot-powered lawn edger comprising, in combination with a handle carrying a forked frame upon the working end thereof, cutting, ratchet and traction wheels made rigid, one with another, and carried by said forked frame for turning movement about a coinciding axis, a treadle-piece also carried by said forked frame for pivotal movement about the same axis and arranged in the use of the edger to swing reciprocally forwardly from and rearwardly to a nearly upright position, a pawl complement for the ratchet teeth of said ratchet wheel carried by the treadle-piece, and spring means yieldingly resisting said forwardly directed swing movement of the treadle-piece whereby when, pressure is exerted by the foot of the operator upon said treadle-piece so as to swing the latter forwardly from said nearly upright position it acts to press the cutting wheel into the lawn being edged and at the same time causes the cutting and traction wheels to turn by the motion transmitted from the pawl to the ratchet wheel.

INGVALD MJELVA.

REFERENCES CITED

The following references are of record in the file of this patent:

UNITED STATES PATENTS

| Number | Name | Date |
|---|---|---|
| 1,582,359 | Trowbridge | Apr. 27, 1926 |
| 1,714,817 | Randleman | May 28, 1929 |
| 1,928,718 | Covey | Oct. 3, 1933 |
| 1,964,366 | Schwarz | June 26, 1934 |

FOREIGN PATENTS

| Number | Country | Date |
|---|---|---|
| 53,672 | Germany | May 25, 1942 |
| 331,122 | Italy | Oct. 30, 1935 |
| 605,071 | Great Britain | July 15, 1948 |